US008280188B2

(12) United States Patent
Hibi et al.

(10) Patent No.: US 8,280,188 B2
(45) Date of Patent: Oct. 2, 2012

(54) SYSTEM AND METHOD FOR MAKING A CORRECTION TO A PLURALITY OF IMAGES

(75) Inventors: Yoshiharu Hibi, Kanagawa (JP); Masaru Okutsu, Kanagawa (JP); Atsushi Kitagawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 292 days.

(21) Appl. No.: 12/637,584

(22) Filed: Dec. 14, 2009

(65) Prior Publication Data

US 2010/0092080 A1 Apr. 15, 2010

Related U.S. Application Data

(62) Division of application No. 10/854,642, filed on May 27, 2004, now Pat. No. 7,653,246.

(30) Foreign Application Priority Data

Nov. 18, 2003 (JP) .............................. P2003-387674

(51) Int. Cl.
| | | |
|---|---|---|
| G06K 9/00 | (2006.01) |
| G06K 9/34 | (2006.01) |
| G06K 9/40 | (2006.01) |
| G06K 9/46 | (2006.01) |
| G06K 9/66 | (2006.01) |
| G06K 9/20 | (2006.01) |
| G06K 9/36 | (2006.01) |
| G06K 1/00 | (2006.01) |
| G06F 15/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl. ........ 382/294; 382/167; 382/170; 382/173; 382/190; 382/254; 382/282; 358/1.9; 715/243

(58) Field of Classification Search .................. 382/170, 382/190, 203, 100, 115, 128, 167, 173, 192, 382/195, 224, 254, 274, 276, 282–284, 286, 382/293–294, 305; 715/243, 253, 854; 358/1.9, 358/2.1, 3.24, 518–523
See application file for complete search history.

(56) References Cited

U.S. PATENT DOCUMENTS 4,180,798 A 12/1979 Komori et al.
(Continued)

FOREIGN PATENT DOCUMENTS

CN A-1442995 9/2003
(Continued)

OTHER PUBLICATIONS

Yilmaz and Shah, Automatic Feature Detection and Pose Recovery for Faces. ACCV2002, The 5th Asian Conference on Computer Vision, Jan. 23-25, 2002, Melbourne, Australia.

*Primary Examiner* — Anand Bhatnagar
*Assistant Examiner* — Nathan Bloom
(74) *Attorney, Agent, or Firm* — Sughrue Mion, PLLC (57) ABSTRACT

An image processing apparatus includes a feature amount recognition unit that recognizes a feature amount of each of plural pieces of image data, and a processing reference extraction unit that extracts a processing reference for image correction to be made to the plural pieces of image data from the feature amount recognized by the feature amount recognition unit.

6 Claims, 11 Drawing Sheets

U.S. PATENT DOCUMENTS

| | | | |
|---|---|---|---|
| 5,304,988 A | 4/1994 | Seto | |
| 5,581,633 A | 12/1996 | Hotta et al. | |
| 5,729,630 A | 3/1998 | Ikeda | |
| 5,999,647 A | 12/1999 | Nakao et al. | |
| 6,356,655 B1 | 3/2002 | Sumikawa et al. | |
| 6,744,849 B2 | 6/2004 | Nagatsuka | |
| 6,915,273 B1 * | 7/2005 | Parulski | 705/26.5 |
| 6,961,446 B2 | 11/2005 | Imagawa et al. | |
| 6,975,425 B1 | 12/2005 | Abe et al. | |
| 7,272,267 B1 * | 9/2007 | Nakajima | 382/294 |
| 7,623,733 B2 * | 11/2009 | Hirosawa | 382/284 |
| 7,743,322 B2 * | 6/2010 | Atkins | 715/243 |
| 2001/0000025 A1 | 3/2001 | Darrell et al. | |
| 2001/0033685 A1 | 10/2001 | Ishiyama | |
| 2001/0046330 A1 * | 11/2001 | Shaffer et al. | 382/284 |
| 2002/0028004 A1 | 3/2002 | Miura et al. | |
| 2002/0034336 A1 * | 3/2002 | Shiota et al. | 382/274 |
| 2002/0093670 A1 * | 7/2002 | Luo et al. | 358/1.9 |
| 2002/0097906 A1 | 7/2002 | Ishiyama | |
| 2003/0039380 A1 | 2/2003 | Sukegawa et al. | |
| 2003/0053689 A1 * | 3/2003 | Watanabe et al. | 382/167 |
| 2003/0133599 A1 | 7/2003 | Tian et al. | |
| 2003/0156196 A1 | 8/2003 | Kato et al. | |
| 2004/0021779 A1 | 2/2004 | Yano | |
| 2004/0146198 A1 | 7/2004 | Herley | |
| 2004/0161134 A1 | 8/2004 | Kawato et al. | |
| 2005/0129311 A1 | 6/2005 | Haynes et al. | |
| 2005/0152613 A1 * | 7/2005 | Okutsu et al. | 382/254 |
| 2006/0182348 A1 | 8/2006 | Kinjo | |

FOREIGN PATENT DOCUMENTS

| | | |
|---|---|---|
| GB | 2 325 582 | 11/1998 |
| JP | 09-116740 | 5/1996 |
| JP | 09-069165 | 3/1997 |
| JP | 10-336673 | 12/1998 |
| JP | 11-144067 | 5/1999 |
| JP | 11-185018 | 7/1999 |
| JP | 2000-040142 | 2/2000 |
| JP | 2001-1209361 | 8/2001 |
| JP | 2002-209088 | 7/2002 |
| JP | 2003-101749 | 4/2003 |
| JP | 2003-190125 | 7/2003 |
| JP | 2003-27427 | 9/2003 |
| JP | 2003-274139 | 9/2003 |

* cited by examiner

FIG. 4(a)
RECOGNITION OF SUBJECT

IMAGE PATTERN 1

FIG. 4(b)
CONTOUR EXTRACTION

FIG. 4(c)
EXTRACTION OF RECTANGLE CIRCUMSCRIBING SUBJECT AND RECTANGLE INFORMATION CALCULATION $(Xg1, Yg1)$, $Yd1$, $Xd1$, $(Xs1, Ys1)$

IMAGE PATTERN 2

$(Xg2, Yg2)$, $Yd2$, $Xd2$, $(Xs2, Ys2)$

IMAGE PATTERN 3

SYSTEM AND METHOD FOR MAKING A CORRECTION TO A PLURALITY OF IMAGES

This application is a Divisional of U.S. patent application Ser. No. 10/854,642 filed May 27, 2004, now U.S. Pat. No. 7,653,246 and claims the benefit of the Japanese patent Application No. 2003-387674 filed on Nov. 18, 2003, both of which are hereby incorporated by reference in their entirety.

BACKGROUND OF THE INVENTION

1. Field of the Invention

This invention relates to an image processing apparatus, etc., for processing a taken photograph image, etc., for example, and more particularly to an image processing apparatus, etc., for making a correction to plural images.

2. Description of the Related Art

For example, a job of placing plural images such as photograph images (image data, digital images) taken with a digital camera (digital still camera (DSC)) and images read through a scanner in a predetermined area and visualizing the edited layout image for output is widely conducted, for example, in a print market of use for commodity advertising circulars, advertisement, magazine articles, etc., and in a business market of exhibition and seminar materials, spot record photos, preparing commodity snaps of real estate, products, etc. Hitherto, for example, a professional photographer has taken laid-out photograph images and the user of a professional of image processing has made adjustments while observing each image state for editing. On the other hand, in recent years, occasions wherein plural images provided under distributed and different photographing conditions by general users are put into a database have increased with rapid development and widespread use of photographing apparatus represented by a digital camera, a mobile telephone, etc., and the progression of the network technologies of the Internet, etc.

As one of the related arts described in gazettes, a rectangular area circumscribing an additional image with a margin is generated for each of images and the images are placed in accordance with a predetermined placement rule, whereby the images are laid out in a specified area. (For example, refer to JP-A-2003-101749.) Also disclosed is an art of scaling up or down the aspect (length-to-width) ratio of each read image based on the ratio between the length dimension (or width dimension) of the display area and the length dimension (or width dimension) of the image data to display plural pieces of image data of unspecified image sizes on multiple screens in an easy-to-see manner. (For example, refer to JP-A-2000-40142.)

SUMMARY OF THE INVENTION

If all photograph images are taken in fixed photographing conditions, etc., it is made possible to produce easy-to-see layout display. However, if layout display of plural photograph images taken indifferent environments, by different photographers, and in different photographing conditions is produced as it is using the art in JP-A-2003-101749, JP-A-2000-40142, etc., described above, easy-to-see layout display is not provided. For example, even if photographs of limited types of commodities, such as packages of cosmetics and confectionery and toys of miniature cars, etc., are taken, if they are taken in different conditions (photographing location, time, subject position, subject angle, lighting, camera, etc.) the laid-out images become very awkward due to discrepancy in the sizes, positions, inclinations, etc., of the commodities. Awkward images in layout display result not only from the geometrical feature amount difference, but also from the feature amount difference relative to the image quality of brightness, color, gray balance, half-toning, etc., of each image. Further, whether or not a background exists also becomes an obstacle to referencing plural images in comparison with each other. Hitherto, the image quality has been corrected manually. However, the present situation in which image correction relies only upon artificial or manual work is unfavorable particularly in the business market and the print market where speeding up printout of laid-out images is required and occasions of images publishing in the Web increase.

The present invention has been made in view of the above circumstances and providing good-looking layout output, etc., by automatically correcting each image to output plural images collectively, and also providing corrected main subjects and backgrounds in plural images using a statistical technique.

To the end, an image processing apparatus incorporating the invention includes a feature amount recognition unit that recognizes a feature amount of each of plural pieces of image data, and a processing reference extraction unit that extracts a processing reference for image correction to be made to the plural pieces of image data from the feature amount recognized by the feature amount recognition unit.

From another aspect of the invention, an image processing apparatus incorporating the invention includes an input unit that inputs plural digital images, a feature amount recognition unit that recognizes a geometrical feature amount of a main subject from each of the plural digital images input through the input unit, and a geometrical correction unit that makes a correction to the main subject of each of the plural digital images so that the images are geometrically unified from the geometrical feature amount recognized by the feature amount recognition unit.

On the other hand, an image processing apparatus incorporating the invention includes an input unit that inputs plural digital images, a feature amount recognition unit that recognizes a feature amount concerning an image quality of a main subject from each of the plural digital images input through the input unit, and an image quality correction unit that makes a correction to the main subject of each of the plural digital images so that the image quality is unified from the feature amount concerning the image quality recognized by the feature amount recognition unit.

Further, an image processing apparatus incorporating the invention includes a feature amount recognition unit that extracts a background area from each of plural digital images and recognizes a feature amount concerning each background, and a background correction unit that makes a correction to each image so that backgrounds are unified from the feature amount concerning the background recognized by the feature amount recognition unit.

From another aspect of the invention, an image processing method incorporating the invention includes inputting plural pieces of image data, recognizing a feature amount of a main subject of each of the plural pieces of image data input, setting a processing reference for image correction to be made to each of the main subjects from the recognized feature amount, making a correction to the main subject using the set processing reference, and outputting image data with the main subject to which the correction has been made.

Further, an image processing method incorporating the invention includes inputting plural pieces of image data, recognizing a background area in each of the plural pieces of image data input, making a correction to the plural pieces of image data so that the recognized background areas are unified, and outputting the plural pieces of image data to which the correction has been made.

A storage medium readable by a computer, the storage medium storing a program incorporating the invention of instructions executable by the computer to perform a function for processing an image, the function includes the steps of recognizing a main subject in each of plural pieces of image data input, recognizing a feature amount of each of the recognized main subjects, setting a processing reference for image correction to be made to each of the main subjects from the recognized feature amount, and making a correction to the main subject using the set processing reference.

A storage medium readable by a computer, the storage medium storing a program incorporating the invention of instructions executable by the computer to perform a function for processing an image, the function includes the steps of recognizing a background area in each of plural pieces of image data input, and making a correction to the plural pieces of image data so that the recognized background areas are unified.

The invention makes it possible to automatically correct each image and provide good-looking layout output, etc., to output plural images collectively.

BRIEF DESCRIPTION OF THE DRAWINGS

Preferred embodiments of the present invention will be described in detail based on the following figures, wherein.

DETAILED DESCRIPTION OF THE INVENTION

Referring now to the accompanying drawings, there is shown one embodiment of the invention.

Figure 1:
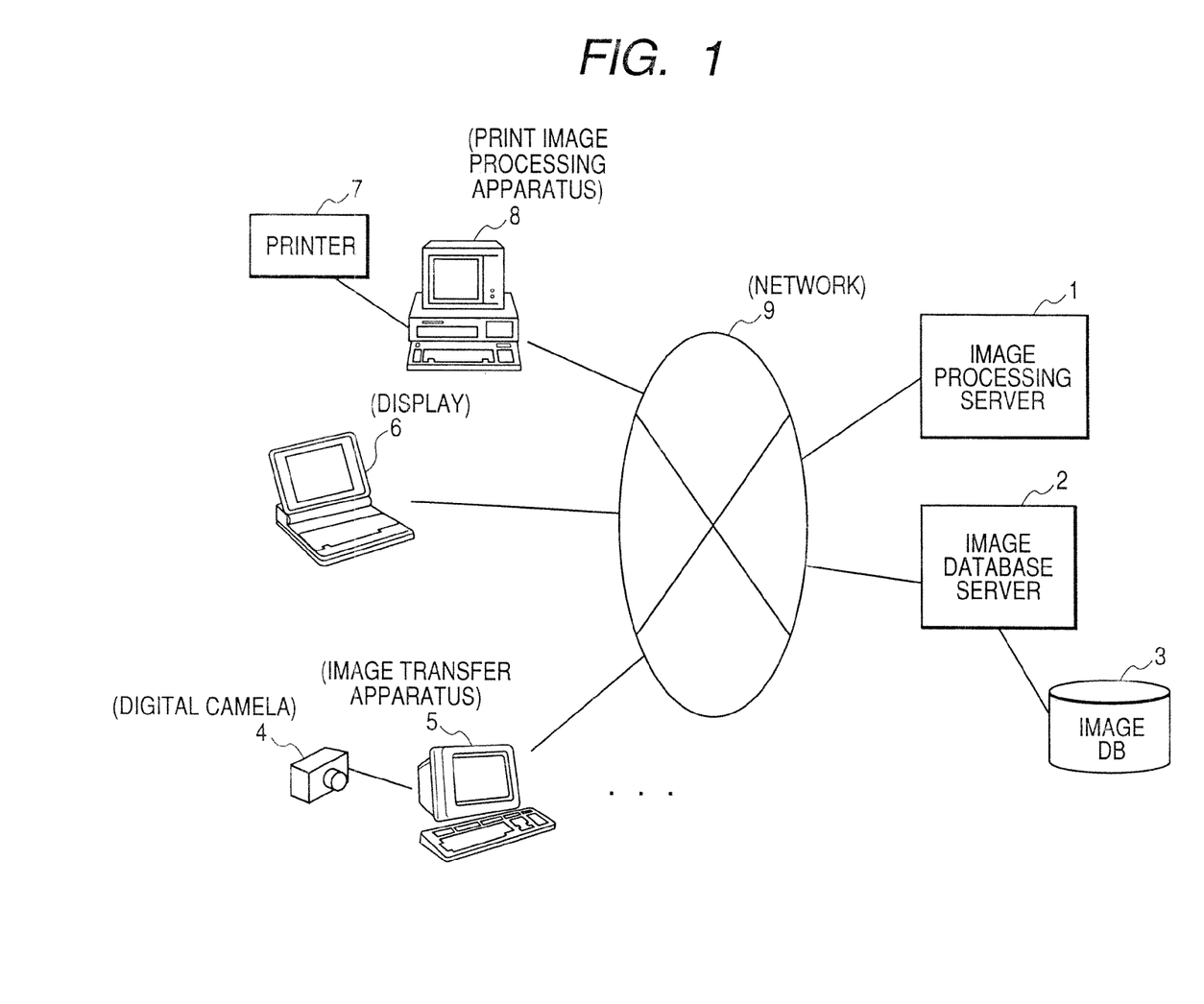
FIG. 1 is a drawing to show a general configuration example of an image processing system incorporating an embodiment of the invention.

FIG. 1 is a drawing to show a general configuration example of an image processing system incorporating an embodiment of the invention. Here, functions are connected through a network 9 such as the Internet. The image processing system shown in FIG. 1 includes an image processing server 1 for performing integrated layout processing of distributed taken photograph images, an image database server 2 for acquiring distributed taken photograph images and selecting images for which integrated layout processing is to be performed, and one or more image databases (image DBs) 3 being connected to the image database server 2 for storing distributed taken photograph images. The image processing system also includes an image transfer apparatus 5 for reading a photograph image taken with a digital camera 4 of a photographing unit and transferring the image to the image database server 2 through the network 9, a display 6 for displaying the image subjected to the integrated layout processing in the image processing server 1, and a print image processing apparatus 8 for performing various types of image processing to output the image subjected to the integrated layout processing in the image processing server 1 to a printer 7 of an image printout unit. The image transfer apparatus the display 6, and the print image processing apparatus 8 can be implemented as computers such as a notebook computer (notebook PC) and a desktop PC. The image processing server 1 and the image database server 2 can also be grasped as computers such as PCs. The embodiment is characterized by the fact that plural distributed taken photograph images in different photographing locations and different photographing conditions are integrated. In this point, plural digital cameras 4 and plural image transfer apparatus 5 connected thereto are connected to the network 9.

For easy understanding, a description is given by making a comparison between layout processing in a related art and integrated layout processing in the embodiment.

Figure 10A:
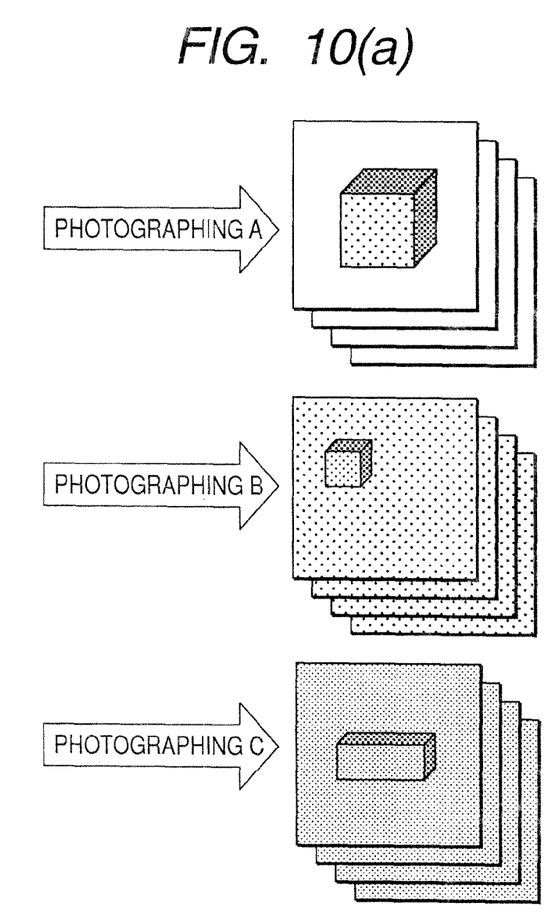
FIGS. 10A and 10B are drawings to show an example wherein integrated layout processing in the embodiment is not performed.
Figure 10B:
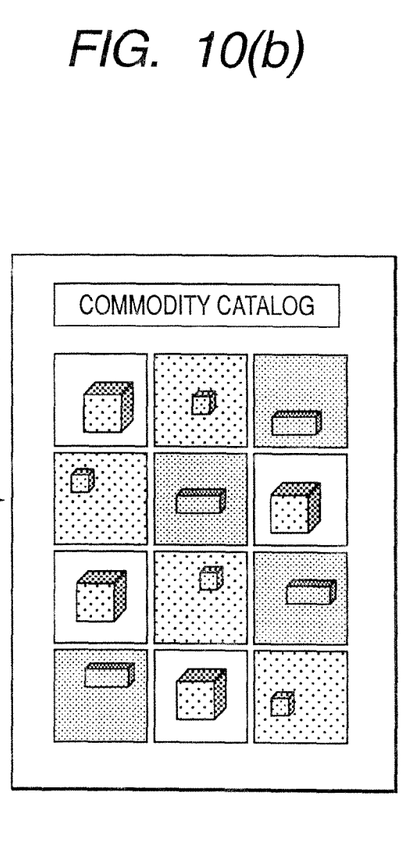

FIGS. 10A and 10B are drawings to show an example wherein the integrated layout processing in the embodiment described later is not performed. In FIG. 10A, photographing A, photographing B, and photographing C show photograph image examples taken in different environments, sent from the image transfer apparatus 5 to the image database server 2, and stored in one more image DBs 3 as memory. For example, in the document of photographing A, the object (main subject) is photographed comparatively large and in sufficient brightness and the brightness of the image is also comparatively good. In the document of photographing B, the object is photographed small and the image is not sufficiently bright. Also, the subject is placed largely off center. In the document of photographing C, the size of the object is adequate, but the image is a dark image with very low illumination. If such photograph images taken in different photographing conditions are laid out without being subjected to processing, they become, for example, as shown in FIG. 10B. The subjects vary in size and the positions of the subjects in the images are not constant. The images also vary in image quality, namely, brightness, color reproduction, etc., and consequently, the created document quality is very poor.

Figure 11A:
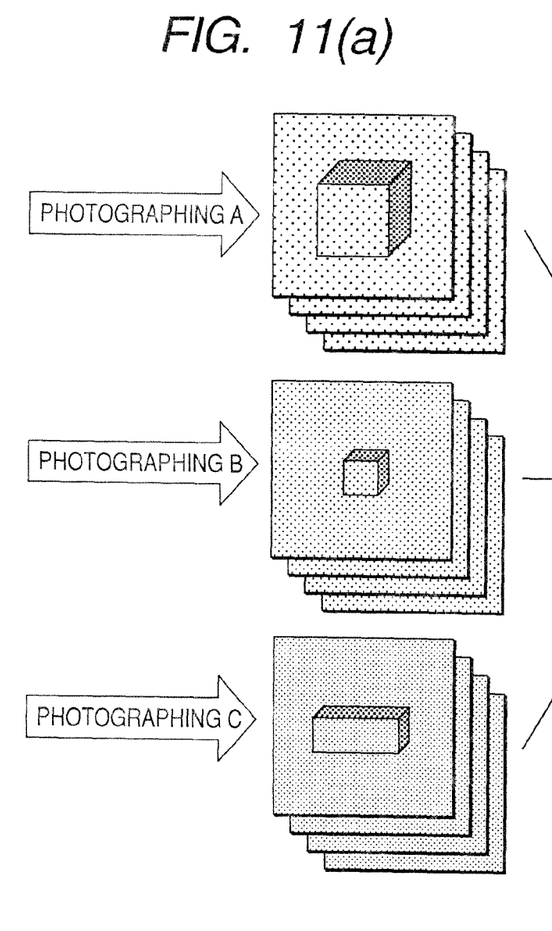
FIGS. 11A and 11B are drawings to show an example wherein integrated layout processing in the embodiment is performed.
Figure 11B:
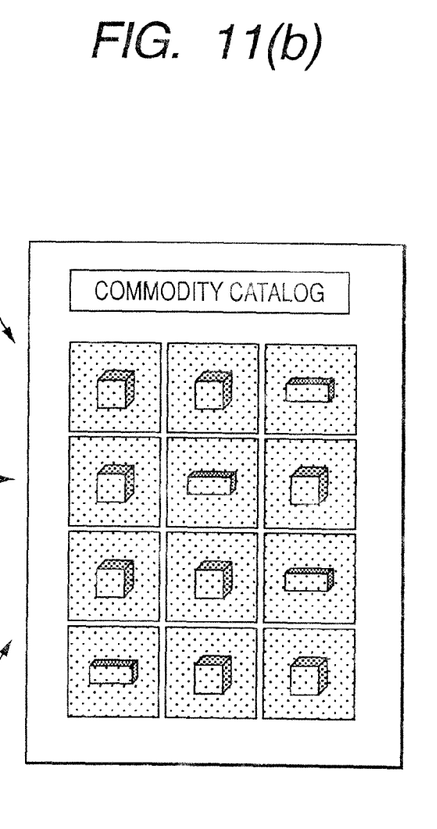

FIGS. 11A and 11B are drawings to show an example wherein the integrated layout processing in the embodiment is performed. If photograph images taken in different environments and different in image quality and having different geometrical features of subjects as in FIG. 10A are integrated-laid-out, an integrated document as shown in FIG. 11B can be provided automatically using a statistical technique. In the integrated document, the geometrical feature amount of the object of the subject and the image processing feature amount are extracted from each image shown in FIG. 11A and the reference is set based on the extracted different types of feature amounts and a correction is made to each image. Correction is made to each image so that not only the brightness of the object as the main subject, but also the background of the subject is unified among the images. That is, first the geometrical feature amount of the size, position, etc., is extracted and the feature amount about the image quality of the brightness of the image, color reproduction, etc., is also extracted. The feature amounts are collected, the reference is set based on a given condition, and each image is corrected so as to match the reference to generate an integrated layout. Accordingly, it is made possible to provide a good-looking layout image with the size, position, background, brightness, etc., unified like the commodity catalog as in FIG. 11B, for example.

Figure 2:
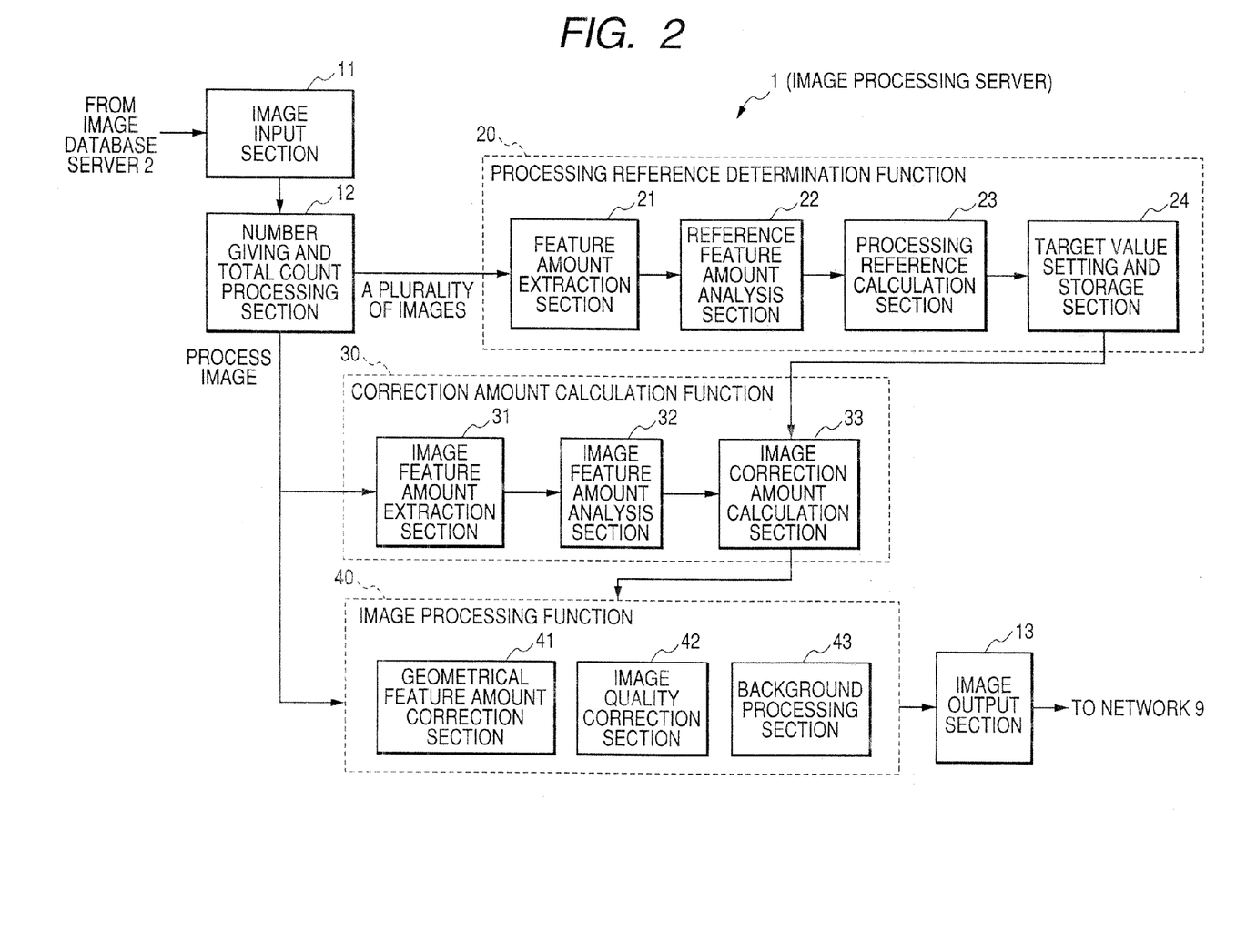
FIG. 2 is a functional block diagram to execute integrated layout processing in the embodiment of the invention.

FIG. 2 is a functional block diagram to execute the integrated layout processing in the embodiment as described with reference to FIGS. 11A and 11E. The image processing server 1 for mainly executing an integrated layout includes an image input section 11 for acquiring image data (digital images) stored in the image DB 3 from the image database server 2, a number giving and total count processing section 12 for executing preprocessing of giving image numbers (Gn), total count, etc., for plural images input through the image input section 11, and an image output section 13 for sending discrete images subjected to image processing to the network 9 separately or in a layout state. The image processing server 1 also includes a processing reference determination function 20 for acquiring the geometrical feature amounts and the image quality feature amounts from the images passed through the number giving and total count processing section 12 and calculating the processing reference, a correction amount calculation function 30 for analyzing the feature amount of each discrete image input through the image input section 11 and subjected to preprocessing of giving image numbers (Gn), total count, etc., by the number giving and total count processing section 12 and calculating the image correction amount based on the output from the processing reference determination function 20, and an image processing function 40 for executing various types of image processing based on the correction amounts of the discrete images calculated by the correction amount calculation function 30.

The correction amount calculation function 30 makes it possible to analyze the state of each image to be subjected to actual image processing and makes it possible to correct the difference from the determined processing reference of plural images. A configuration wherein the correction amount calculation function 30 is not provided is also possible. In this case, processing determined uniformly by the processing reference determined from plural images is performed independently of the state of each image. The processing mode can also be switched depending on the processing type. For example, in processing for making the background uniform, the processing reference is determined based on majority rule, average, etc., from plural images and uniformly determined processing is performed independently of the state of each image. On the other hand, to make the brightness level uniform based on the average of an image group, preferably the state of each image is analyzed by the correction amount calculation function 30 before the difference from the processing reference is corrected.

The functions will be further discussed. The processing reference determination function 20 includes a feature amount extraction section 21 for acquiring the geometrical feature amount and the feature amount of background information, various pieces of image quality information of color, etc., from plural images to be subjected to integrated layout processing, a reference feature amount analysis section 22 for analyzing the feature amounts of plural images extracted by the feature amount extraction section 21, a processing reference calculation section 23 for calculating the processing reference from the images, and a target value setting and storage section 24 for setting the target value from the calculated processing reference and storing the setup value in memory (not shown). The correction amount calculation function 30 includes an image feature amount extraction section 31 for extracting the feature amounts of the geometrical feature amount, the image quality feature amount, etc., of each image to be subjected to correction processing, an image feature amount analysis section 32 for analyzing the feature amount of the image whose feature amount is extracted by the image feature amount extraction section 31, and an image correction amount calculation section 33 for calculating the correction amount of the image based on the feature amount analyzed by the image feature amount analysis section 32 and the processing reference calculated by the processing reference calculation section 23. Further, the image processing function 40 includes a geometrical feature amount correction section 41 for correcting the geometrical feature amount of the size, position, inclination, etc., of the object recognized as the main subject, an image quality correction section 42 for correcting the image quality of brightness, color, gray balance, gradation correction, etc., and a background processing section 43 for making background correction such as removal of the background or unifying the background.

The image quality correction section 42 includes functions of smoothing processing of performing noise suppression processing, brightness correction of moving the reference point depending on whether the image distribution is to a light side or a dark side, highlight shadow correction of adjusting the distribution characteristic of a light portion and a shadow portion of image distribution, and light and dark contrast correction of obtaining the distribution state from a light and dark distribution histogram and correcting the light and dark correction, for example. The image quality correction section 42 has functions of hue and color balance correction of correcting color shift in a white portion with the white area considered the lightest as the reference, for example, saturation correction of performing processing for an image a little low in saturation so as to become clear (brilliant) and an image close to gray so as to suppress saturation, for example, stored color correcting of correcting a specific stored color, such as correcting so as to bring close to skin color with the skin color as the reference, for example, and the like. Further, the image quality correction section 42 can include a sharpness enhancement processing function of determining the edge strength from the whole edge degree and correcting to a sharp image, for example.

Next, the processing executed in the functional blocks shown in FIG. 2 will be discussed.

To begin with, the processing steps of the geometrical feature amount will be discussed.

Figure 3:
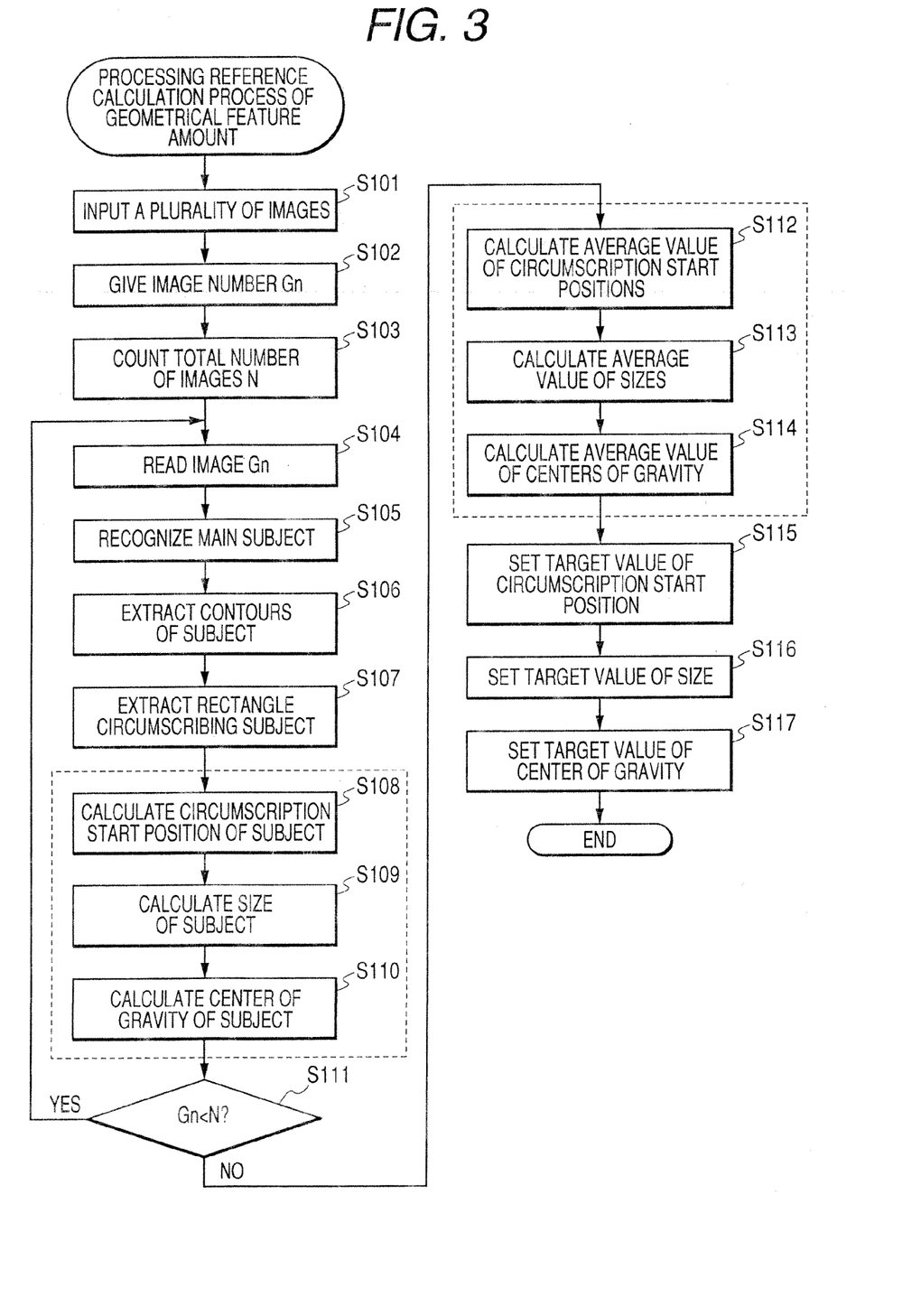
FIG. 3 is a flowchart to show the processing reference calculation process of the geometrical feature amount.

FIG. 3 is a flowchart to show the processing reference calculation process of the geometrical feature amount. In the image processing server 1, first plural images (image data, digital images) are input through the image input section 11 (step 101) and the number giving and total count processing section 12 gives image number Gn to each input image (step 102) and counts the total number of images N (step 103). Next, the processing reference determination function 20 reads the image Gn in order starting at the first image G1, for example, (step 104). The main subject is recognized by the feature amount extraction section 21 (step 105) and the contours of the recognized main subject (subject) are extracted (step 106) and then the rectangle circumscribing the subject is extracted (step 107). The processing reference calculation section 23 executes various types of calculation processing at steps 108 to 110. That is, the circumscription start position of the subject is calculated (step 108) and the size of the subject is calculated (step 109). Then, the center of gravity of the subject is calculated (step 110).

Figure 4A:
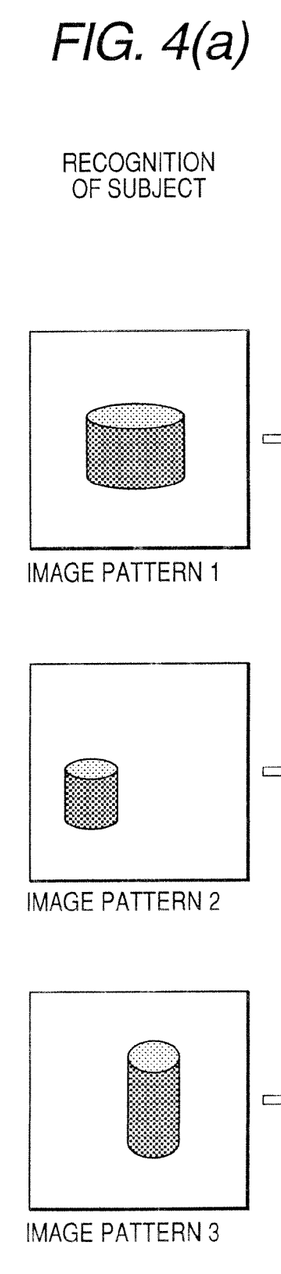
FIGS. 4A to 4C are drawings to describe processing at steps 105 to 110 shown in FIG. 3.
Figure 4B:
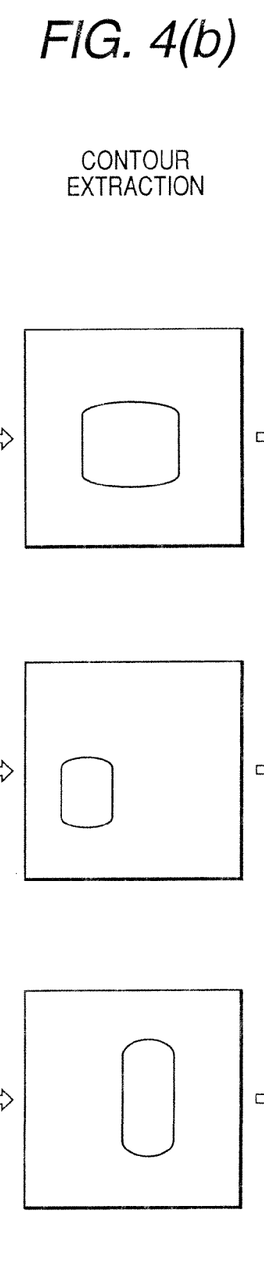
Figure 4C:
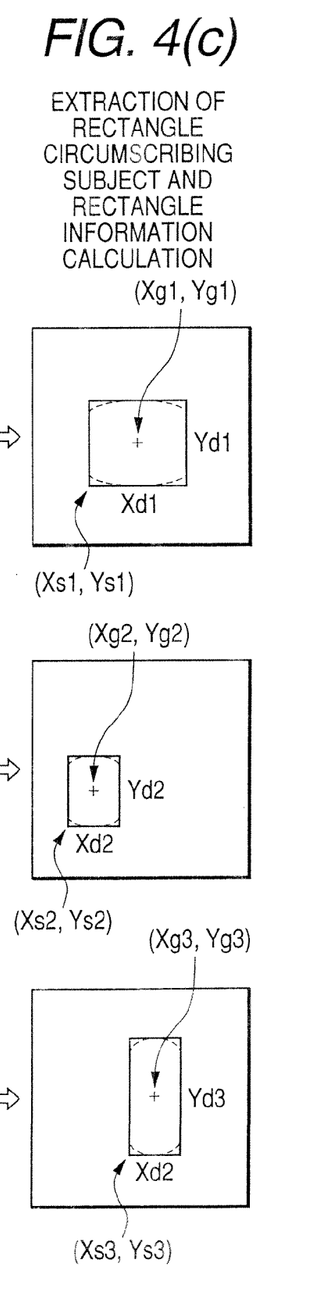

FIGS. 4A and 4B are drawings to describe the processing at steps 105 to 110 described above and show the process until the processing references of image patterns 1 to 3 are calculated. FIG. 4A shows an example of recognition of a subject; FIG. 4B shows an example of contour extraction; and FIG. 4C shows an example of extraction of a rectangle circumscribing the subject and rectangle information calculation. As shown in FIG. 4A, at step 105, the main subject is separated from the background and the subject is recognized. At step 106, the contours are extracted for each image pattern, and a void image, for example, as shown in FIG. 4B is provided. The rectangle circumscribing the subject as shown in FIG. 4C is extracted from the extracted contours at step 107. At steps 108 to 110, the circumscription start position of the subject (for example, (Xs1, Ys1), (Xs2, Ys2), (Xs3, Ys3)), the size of the subject (for example, (Xd1, Yd1), (Xd2, Yd2), (Xd3, Yd3)), and the center-of-gravity coordinates of the subject (for example, (Xg1, Yg1), (Xg2, Yg2), (Xg3, Yg3)) are calculated for each image from the extracted rectangle circumscribing the subject.

Referring again to FIG. 3, whether or not the number of processed images exceeds the total number of images N, namely, Gn<N is determined (step 111) following step 110. If the number of processed images does not exceed the total number of images N, the process returns to step 104 and step 104 and the later steps are executed for repeating calculation processing for each image. If the number of processed images exceeds the total number of images N, the processing reference calculation section 23 executes average value calculation processing at steps 112 to 114. At step 112, the average value of the circumscription start positions (XsM, YsM) is calculated as XsM=average (Xs1, Xs2, Xs3) and YsM=average (Ys1, Ys2, Ys3). At step 113, the average value of the sizes is calculated as XdM=average (Xd1, Xd2, Xd3) and YdM=average (Yd1, Yd2, Yd3). Further, at step 114, the average value of the centers of gravity is calculated as XgM=average (Xg1, Xg2, Xg3) and YgM=average (Yg1, Yg2, Yg3). After the processing references are thus calculated the target value setting and storage section 24 sets the target value of the circumscription start position (step 115), the target value of the size (step 116), and the target value of the center of gravity (step 117). The setup target values are stored in the memory (not shown) and the processing reference calculation process of the geometrical feature amount is now complete.

The target values of the geometrical feature amount can also be determined based on the specification of the user. For example, messages such that
  match centers of gravity of subjects at the center;
  match subjects with the largest subject;
  match subjects with the smallest subject; and
  match sizes and positions with the average size and the average position
can be displayed on a display, for example, and the user can be prompted to specify one of them. In the example of setting the target values in FIG. 3, the average values are automatically calculated as the target values. To prompt the user to make specification, the target value setting and storage section 24 can change the target value setting method based on the specification of the user and can store the target values in the memory. The target values can also be set when the actual correction process is executed.

Figure 5:
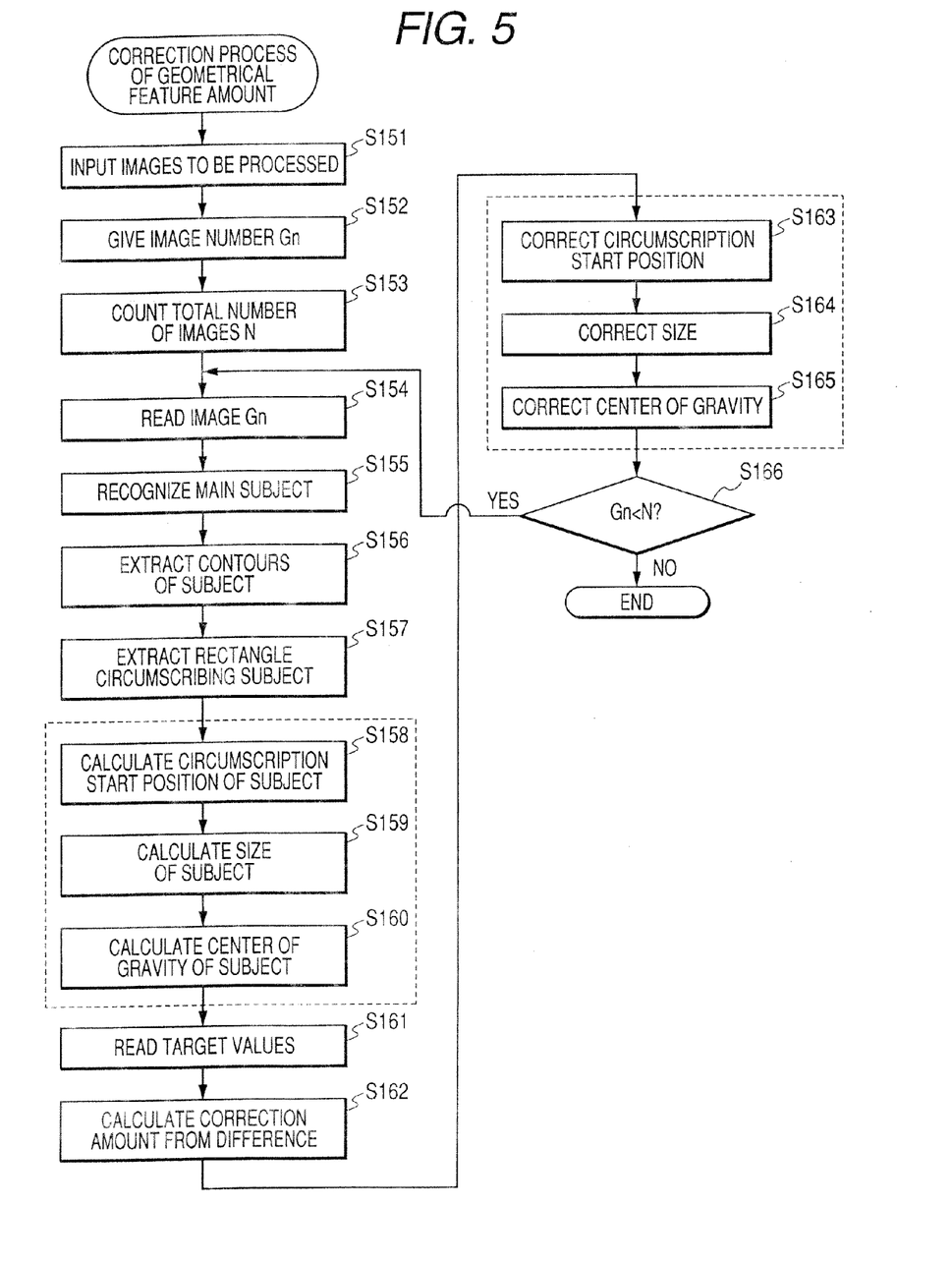
FIG. 5 is a flowchart to show the correction process of the geometrical feature amount.

FIG. 5 is a flowchart to show the correction process of the geometrical feature amount.

In the correction process of the geometrical feature amount, actual correction processing is performed based on the target values of the processing references acquired as the process shown in FIG. 3 is executed. As the correction processing, a method of performing uniformly determined processing independently of the state of each image and a method of analyzing the state of each image and correcting the difference from the processing reference are available. In FIG. 5, the latter method is taken as an example.

In the correction process of the geometrical feature amount, in the image processing server 1 shown in FIG. 2, first, images (image data, digital images) to be processed are input through the image input section 11 (step 151) and the number giving and total count processing section 12 gives image number Gn to each input image (step 152) and counts the total number of images to be processed, N, (step 153). The user can also be prompted to specify the images to be processed. In such a case, the total number of the images specified by the user becomes the total number of images N. Next, the correction amount calculation function 30 reads the image Gn (the first image at the beginning) from among N images (step 154). The main subject to be processed is recognized by the image feature amount extraction section 31 (step 155) and the contours of the recognized main subject (subject) are extracted (step 156) and then the rectangle circumscribing the subject is extracted (step 157). Then, the image feature amount analysis section 32 analyzes the feature amount of the image to be processed. Specifically, the circumscription start position of the subject is calculated (step 158) and the size of the subject is calculated (step 159). Then, the center of gravity of the subject is calculated (step 160). The analysis may be not all conducted depending on the image correction processing method.

Then, the image correction amount calculation section 33 reads the target values set and stored by the target value setting and storage section 24 (step 161) and calculates the correction amount from the difference between the feature amount analyzed by the image feature amount analysis section 32 and each of the read target values (step 162). The calculated correction amount is output to the image processing function 40. The geometrical feature amount correction section 41 of the image processing function 40 corrects the circumscription start position (step 163), corrects the size (step 164), and corrects the center of gravity (step 165) as required. Whether or not the corrections have been executed to the total number of images N, namely, Gn<N is determined (step 166). If the total number of images N is not exceeded, the process returns to step 154 and step 154 and the later steps are repeated for executing correction processing for the next image to be processed. If the total number of images N is exceeded, the correction process of the geometrical feature amount is terminated. A description is given using the pattern example shown in FIGS. 4A to 4C. For example, to correct image pattern 2 using the average value of the circumscription start positions (XsM, YsM) and the average value of the sizes (XdM, YdM),
  image shift: (XsM-Xs2, YsM-Ys2) pixel shift
  image scaling-up: (YdM/Yd2) times . . . (match with longitudinal scale).
Such correction is added, whereby it is made possible to provide easy-to-see layout output with the geometrical feature amounts unified, as shown in FIG. 11B.

Next, each process of image quality processing will be discussed.

Figure 6:
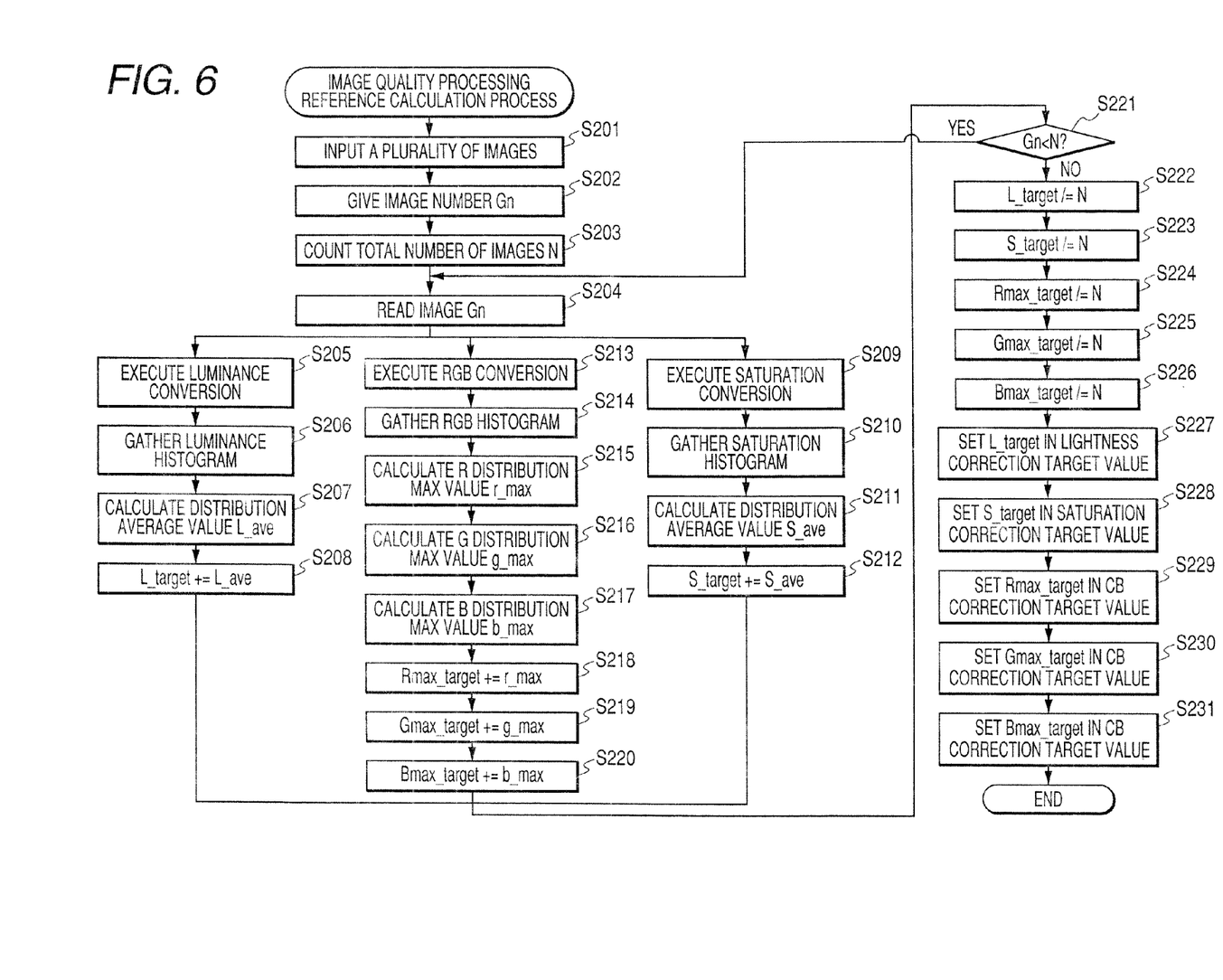
FIG. 6 is a flowchart to show the image quality processing reference calculation process.

FIG. 6 is a flowchart to show the image quality processing reference calculation process. In the image processing server 1, first plural images are input through the image input section 11 (step 201) and the number giving and total count processing section 12 gives image number Gn to each input image (step 202) and counts the total number of images N (step 203).

Next, the processing reference determination function 20 reads the image Gn in order starting at the first image G1, for example, (step 204). Then, for the main subject, target value setting processing is executed about luminance, R (red), green (G), B (blue), and saturation. First, for the main subject separated from the background, conversion to L*a*b*, for example, J executed and luminance conversion is executed (step 205) and a luminance histogram is gathered (step 206). Then, distribution average value L_ave is calculated (step 207) and calculated L_ave is added to find L_target (step 208). The luminance conversion is used for highlight shadow correction and light and dark contrast correction, for example. For example, in the light and dark contrast correction, light and dark distribution (for example, histogram) is taken from the reference image and a value such that almost the same distribution is provided as about five steps of the range are set becomes the target value.

On the other hand, to make saturation correction, saturation conversion is executed (step 209). First, for the main subject separated from the background, a saturation histogram is gathered (step 210) and distribution average value S_ave is calculated (step 211). Calculated S_ave is added to find S_target (step 212). Here, the saturation can be represented with two planes of a*b* of L*a*b*. When a*b* is 00, gray is produced. As the reference, the portion close to gray is made gray, namely, if the portion is a little colored, it is corrected to gray with the saturation suppressed. In the distribution with medium or high saturation, saturation correction is made so as to enhance clearness (brightness). At steps 209 to 212, the target for saturation correction is determined from the distribution average value of the main subject about each pixel.

Further, for example, to make hue and color balance correction, RGB conversion is executed (step 213). First, for the main subject separated from the background, RGB histogram is gathered (step 214), r_max of the maximum value of R distribution is calculated (step 215), g_max of the maximum value of G distribution is calculated (step 216), and b_max of the maximum value of B distribution is calculated (step 217). Calculated r_max is added to find Rmax_target (step 218), calculated g_max is added to find Gmax_target (step 219), and calculated b_max is added to find Bmax_target (step 220). To make hue and color balance correction, R, G, and B histograms are gathered separately and, for example, the lightest RGB histogram point is determined white and if fogging of yellow, green, etc., occurs in this portion, it is assumed that the white portion shifts, and white balance is adjusted so that the same start is set.

Following step 220, whether or not the number of processed images exceeds the total number of images N, namely, Gn<N is determined (step 221). If the number of processed images does not exceed the total number of images N, the process returns to step 204 and step 204 and the later steps are executed for repeating calculation processing for each image. If the number of processed images exceeds the total number of images N, the processing reference calculation section 23 executes the following processing: First, the processing reference calculation section 23 divides the addition value (sum) of the calculation results of plural images by N to find the average value. That is, the value is divided by N to find the average value for L_target calculated by adding (step 222). Likewise, the value is divided by N to find the average value for S_target calculated by adding (step 223), the average value of Rmax_target is calculated (step 224), the average value of Gmax_target is calculated (step 225), and the average value of Bmax_target is calculated (step 226). The target value setting and storage section 24 sets thus calculated L_target in the lightness correction target value (step 227), sets S_target in the saturation correction target value (step 228), sets Rmax_target in the color balance (CB) correction target value (step 229), sets G_max target in the CB correction target value (step 230), and sets B_max target in the CB correction target value (step 231), and stores them in the predetermined memory (not shown). The image quality processing reference calculation process is now complete.

Next, the actual correction processing will be discussed.

Figure 7:
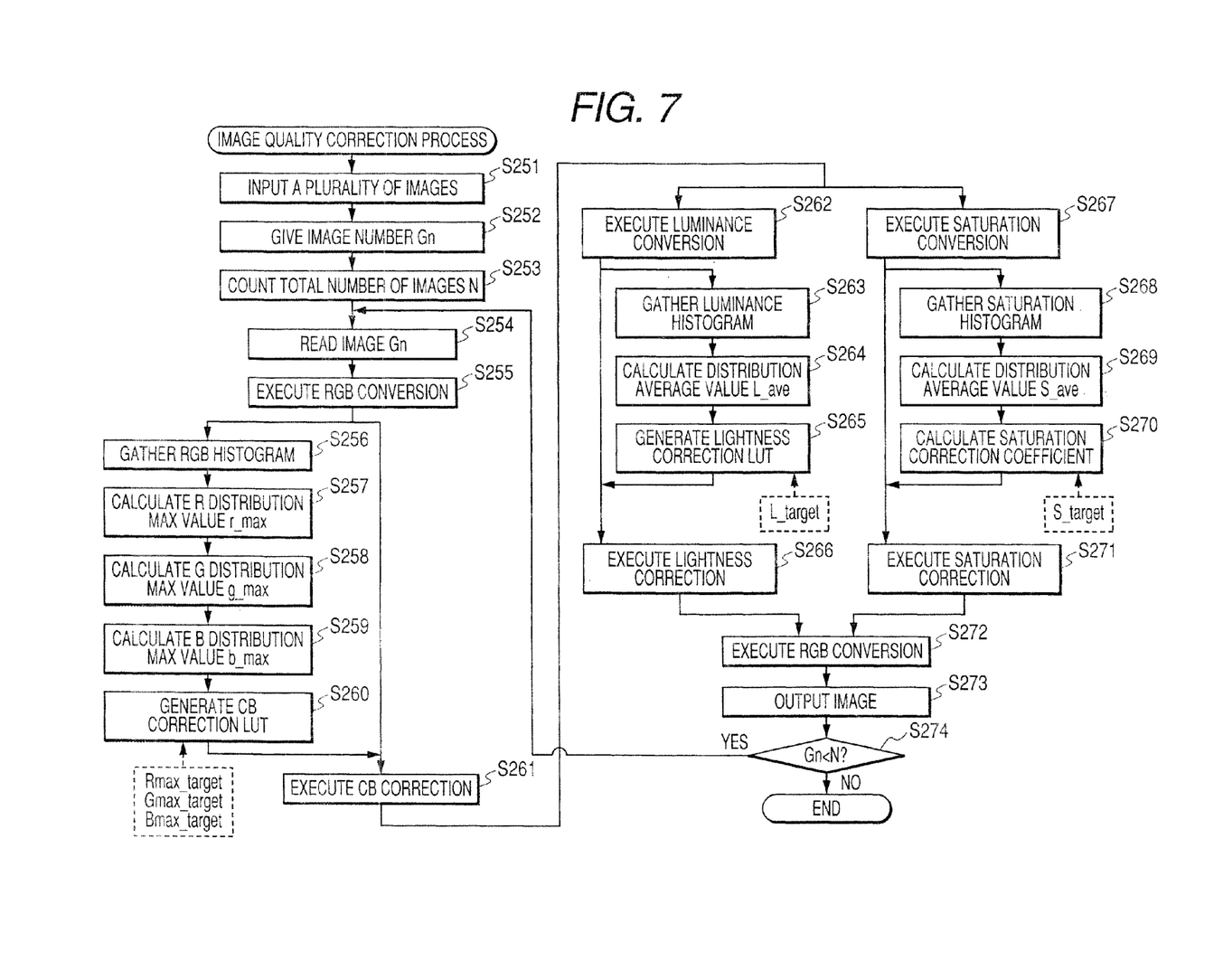
FIG. 7 is a flowchart to show the image quality correction process.

FIG. 7 is a flowchart to show the image quality correction process. In the image processing server 1, first plural images to be processed are input through the image input section 11 (step 251) and the number giving and total count processing section 12 gives image number Gn in order to the images to be processed (step 252) and counts the total number of images N (step 253). Next, in the image feature amount extraction section 31, the image Gn is read in order starting at the first image G1, for example, (step 254). For the main subject separated from the background, RGB conversion is executed (step 255). Then, RGB histogram is gathered (step 256), r_max of the maximum value of R distribution is calculated (step 257), g_max of the maximum value of G distribution is calculated (step 258), and b_max of the maximum value of B distribution is calculated (step 259). Using Rmax_target, Gmax_target, and Bmax_target, the target values set by the target value setting and storage section 24 in the flowchart of FIG. 6, a color balance (CB) correction LUT (lookup table) is generated (step 260) and color balance correction is executed for the image subjected to the RGB conversion (step 261).

For example, after conversion to L*a*b*, luminance conversion at step 262 and the later steps and saturation conversion at step 267 and the later steps are executed for the main subject of the image to be processed. In the luminance conversion at step 262 and the later steps, for example, luminance histogram based on L* is gathered (step 263). Then, distribution average value L_ave is calculated (step 264). Using L_target set by the target value setting and storage section 24 in the processing shown in FIG. 6, a lightness correction LUT is generated (step 265). Then, using this lightness correction LUT, the image quality correction section 42 executes lightness correction (step 266). In the saturation conversion at step 267 and the later steps, a saturation histogram is gathered using a*b*, for example, (step 268) and S_ave is calculated as the distribution average value (step 269). Using S_target set by the target value setting and storage section 24, a saturation correction coefficient is calculated (step 270). Then, using this saturation correction coefficient, the image quality correction section 42 executes saturation correction (step 271). After corrections about the lightness and the saturation are thus performed, RGB conversion is executed conforming to the image output format (step 272) and the image is output (step 273). Whether or not the number of processed images exceeds the total number of images N, namely, Gn<N is determined (step 274). If the number of processed images does not exceed the total number of images N, the process returns to step 254 and step 254 and the later steps are repeated. If the number of processed images exceeds the total number of images N, the correction processing is terminated.

As the corrections are thus made to the image quality, for example, if the same page contains images of the same type, it is made possible to make the objects uniform in brightness, color, and clearness (brilliance). Thus, the image quality is unified using the statistical technique, so that it is made possible to provide an easy-to-see output image for the user.

Next, each process of background processing will be discussed.

Figure 8:
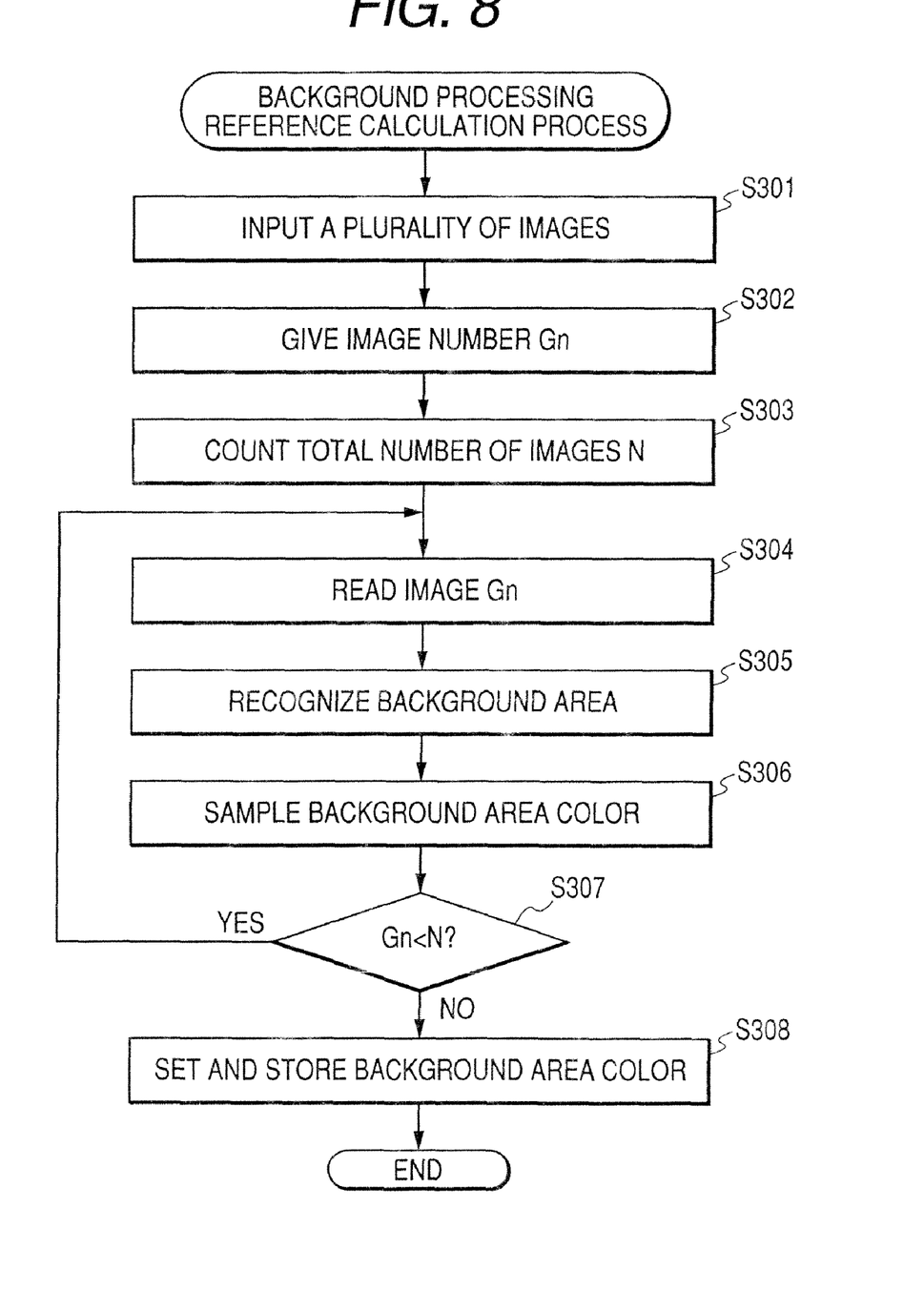
FIG. 8 is a flowchart to show the processing reference calculation process for background processing.

FIG. 8 is a flowchart to show the processing reference calculation process for background processing. In the image processing server 1, first plural images are input through the image input section 11 (step 301) and the number giving and total count processing section 12 gives image number Gn to each input image (step 302) and counts the total number of images N (step 303). Next, the processing reference determination function 20 reads the image Gn in order starting at the first image G1, for example, (step 304). The feature amount extraction section 21 recognizes the background area (step 305) and samples the background area color (step 306). The sampled background area color basically is luminance, lightness, and saturation, and processing is performed in a similar manner to measurement of the main subject shown in FIG. 5. Then, whether or not the number of processed images exceeds the total number of images N, namely, Gn<N is determined (step 307). If the number of processed images does not exceed the total number of images N, the process returns to step 304 and step 304 and the later steps are executed for repeating calculation processing for each image. If the number of processed images exceeds the total number of images N, the target value setting and storage section 24 sets the target value and stores the target value in the memory (not shown) (step 308). For example, if the reference is preset, the stored target value conforms to the reference. If a determination is made in the actual processing, background image information of all images may be stored, for example. To make the background color uniform according to the average, for example, the processing reference calculation section 23 executes average processing, etc.

The target value of the background color can also be determined based on the specification of the user. For example, messages such that make the background color uniform as the lightest background color;

make the background color uniform as the darkest background color;

make the background color uniform as the brilliantest background color, and make the background color uniform according to the average can be displayed, and the user can be prompted to specify one of them for determining the target value. As the feature of the target value, it is assumed that plural pieces of image data exist, and the target value is determined containing statistical processing of selecting the background color according to the maximum, minimum, etc., of clearness (brilliance), determining the background color according to the average, etc.

Figure 9:
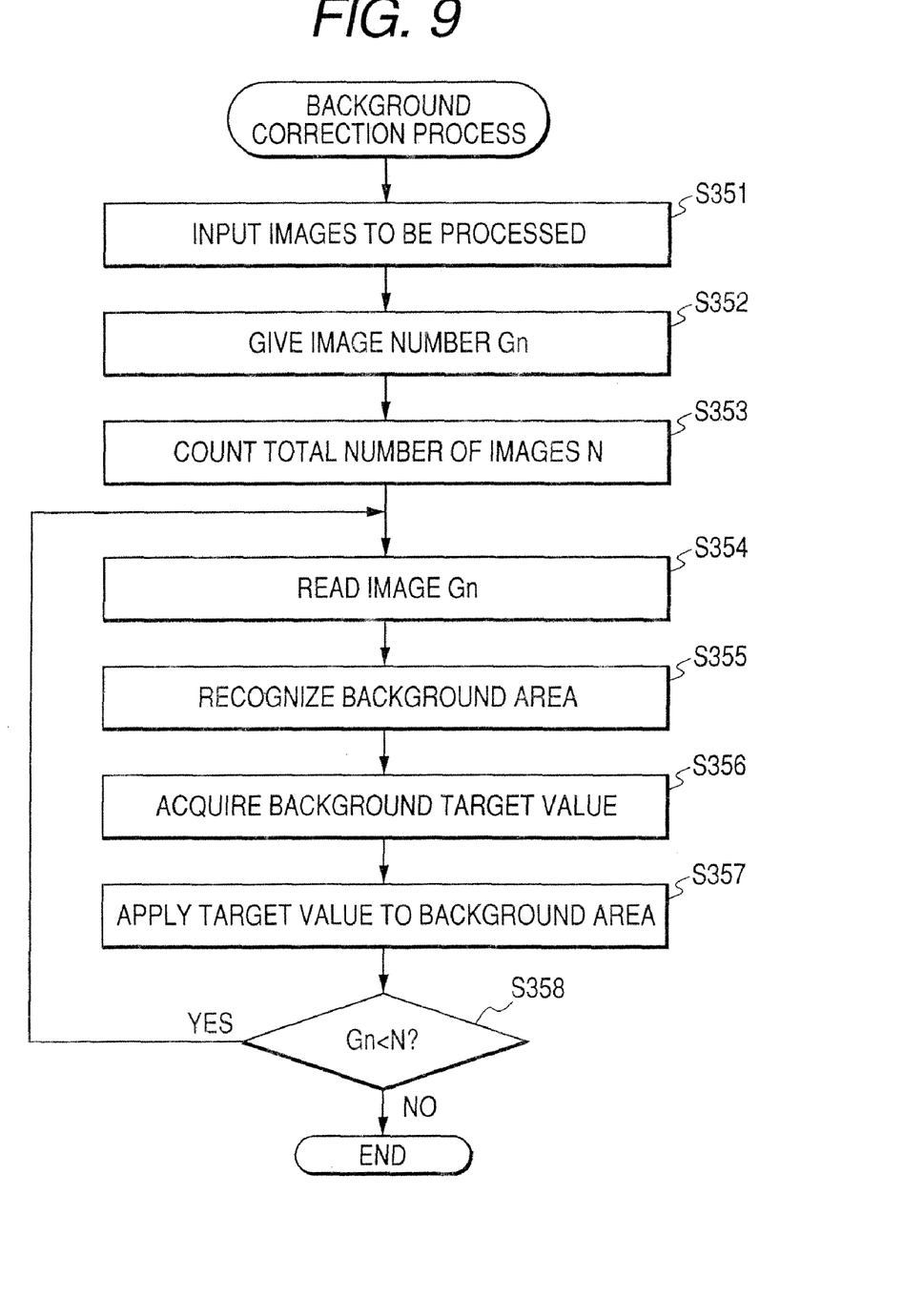
FIG. 9 is a flowchart to show the background color correction process.

FIG. 9 is a flowchart to show the background color correction process. In the image processing server 1, first, images to be processed are input through the image input section 11 (step 351) and the number giving and total count processing section 12 gives image number Gn to each input image (step 352) and counts the total number of images N (step 353). Next, the background processing section 43 reads the image of the image number Gn to be processed in order starting at the first image G1, for example, (step 354) and recognizes the background area (step 355). Then, the background processing section 43 acquires the determined background target value (step 356) and applies the target value to the background area of the image to be processed (step 357). Then, whether or not the number of corrected images exceeds the total number of images N, namely, Gn<N is determined (step 358). If the number of corrected images does not exceed the total number of images N, the process returns to step 354 and step 354 and the later steps are repeated. If the number of processed images exceeds the total number of images N, the correction processing is terminated.

As described above in detail, in the embodiment, the processing reference is determined from plural images (plural pieces of image data) and is applied to each of the images. Uniformly determined processing is performed based on the statistical technique of determination by majority, determination according to the average, etc., independently of the state of each image, so that it is made possible to provide an easy-to-see output image for the user. The determination by majority means that, for example, if the backgrounds of three of four pieces of image data are white and the background of one piece is gray, the backgrounds of all pieces of the image data are made white. In such a case, a correction is made to the background portion of the image with the gray background.

It can be assumed that the embodiment is used for the application type, the printer driver type, the cooperation type with a digital camera, etc. In the application type, the embodiment can be used as an automatic adjustment function of user-collected images as a plug-in software module for placing digital still camera (DSC) images in an album or managing DSC images or the like, for example. In the printer driver type, the embodiment can be set as an optional function in driver setting or can be made a function built in mode setting. Further, in the cooperation type with a digital camera, the embodiment can be applied as a function for enabling the user to enter an adjustment command at the print stage with tag information embedded in the file format.

A computer program incorporating the embodiment can be provided for a computer in such a manner that the program is installed in the computer or that a computer-readable storage medium storing the computer program is supplied. The storage medium may be any of various types of DVD and CD-ROM or a card storage medium, etc., and the program stored on the storage medium is read through a DVD or CD-ROM reader, a card reader, etc., installed in or connected to the computer. The program is stored in an HDD, flash ROM, etc., installed in the computer and is executed by a CPU. The program can also be provided via the network from a program transmission apparatus, for example.

The invention can be utilized for a computer connected to an image formation apparatus such as a printer, a server for providing information through the Internet, etc., a digital camera, a program executed in various computers, etc., for example.

The entire disclosure of Japanese Patent Application No. 2003-387674 on Nov. 18, 2004 including specification, claims, drawings and abstract is incorporated herein by reference in its entirety.

What is claimed is:

1. An image processing apparatus comprising:

a feature amount recognition unit that recognizes a feature amount of each of a plurality of image data; and a processing reference extraction unit that extracts a processing reference for image correction to be made to the plurality of pieces of image data from the feature amount recognized by the feature amount recognition unit, wherein the feature amount recognition unit recognizes an image quality containing at least any one of lightness, contrast, saturation, hue, and sharpness of each of the plurality of pieces of image data as the feature amount, and wherein the feature amount recognition unit further including a target value setting unit that generates an average of the feature amount to be used as a target value to which the main subject are adjusted, wherein the image processing apparatus further includes a background processing unit that unifies a background color of each of the plurality of image data under a majority rule of the background color of each of the plurality of image data.

2. An image processing apparatus in a CPU comprising:

an input unit of the CPU that inputs a plurality of digital images;

a feature amount recognition unit of the CPU that recognizes a feature amount an image quality of a main subject from each of a plurality of digital images input through the input unit; and an image quality correction unit of the CPU that makes a correction to the main subject of each of the plurality of digital images so that the image quality is unified from the feature amount concerning the image quality recognized by the feature amount recognition unit, and wherein the feature amount recognition unit further includes a target value setting unit that generates an average of the feature amount to be used as a target value to which the main subject are adjusted, wherein the image processing apparatus further includes a background processing unit that unifies a background color of each of the plurality of pieces of image data under a majority rule of the background color of each of the plurality of image data.

3. The image processing apparatus as claimed in claim 2, wherein the feature amount concerning the image quality recognized by the feature amount recognition unit is at least any one of a feature amount concerning luminance of the main subject, a feature amount concerning saturation, a feature amount concerning color distribution, a feature amount concerning lightness, and a feature amount concerning sharpness.

4. The image processing apparatus as claimed in claim 2, wherein the target value setting unit sets the target value according to a statistical technique as for the image quality of the main subjects of the plurality of digital images, and wherein the image quality correction unit makes a correction using the target value set by the target value setting unit.

5. The image processing apparatus as claimed in claim 1, wherein when some pieces of the image data having first backgrounds are more than the other pieces of image data having second backgrounds, the majority rules controls the background processing unit so as to unify all backgrounds of the plurality of pieces of image data to have the first backgrounds.

6. The image processing apparatus as claimed in claim 2, wherein when some pieces of the image data having first backgrounds are more than the other pieces of image data having second backgrounds, the majority rules controls the background processing unit so as to unify all backgrounds of the plurality of pieces of image data to have the first backgrounds.

* * * * *